US011057809B2

(12) United States Patent
Ozturk et al.

(10) Patent No.: US 11,057,809 B2
(45) Date of Patent: Jul. 6, 2021

(54) HANDOVER AND CELL CHANGE DUE TO CHANNEL ACCESS PROBLEMS

(71) Applicant: QUALCOMM Incorporated, San Diego, CA (US)

(72) Inventors: Ozcan Ozturk, San Diego, CA (US); Jing Sun, San Diego, CA (US); Xiaoxia Zhang, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/776,276

(22) Filed: Jan. 29, 2020

(65) Prior Publication Data

US 2020/0252846 A1 Aug. 6, 2020

Related U.S. Application Data

(60) Provisional application No. 62/800,253, filed on Feb. 1, 2019.

(51) Int. Cl.
*H04W 36/08* (2009.01)
*H04W 74/08* (2009.01)
(Continued)

(52) U.S. Cl.
CPC .......... *H04W 36/08* (2013.01); *H04W 16/14* (2013.01); *H04W 36/38* (2013.01); *H04W 74/0808* (2013.01)

(58) Field of Classification Search
CPC .... H04B 17/382; H04J 11/0023; H04L 5/001; H04L 5/0033; H04L 5/0073; H04W 16/14–16; H04W 28/0236; H04W 36/00; H04W 36/0016–0044; H04W 36/0058–0094; H04W 36/08; H04W 36/14; H04W 36/16; H04W 36/20; H04W 36/30; H04W 36/305; H04W 36/34;
(Continued)

(56) References Cited

U.S. PATENT DOCUMENTS

2016/0242213 A1   8/2016   Dabeer et al.
2017/0215096 A1   7/2017   Moon et al.

OTHER PUBLICATIONS

Interdigital Inc: "Mobility for NR-U", 3GPP Draft; R2-1811455 (R15 NRU SI AI 11222 Mobility), Aug. 20, 2018-Aug. 24, 2018 Aug. 9, 2018. (Year: 2018).*
(Continued)

*Primary Examiner* — Ronald Eisner
(74) *Attorney, Agent, or Firm* — Procopio, Cory, Hargreaves & Savitch

(57) ABSTRACT

A configuration to enable a UE to obtain access to an unlicensed frequency channel of the unlicensed frequency spectrum in the event of channel access failures. The apparatus receives a configuration from a first base station to perform a conditional handover. The apparatus determines a first unlicensed frequency channel is unavailable for a transmission to the first base station or from the first base station. The apparatus switches from the first unlicensed frequency channel to a second cell for communication through the second cell in the conditional handover upon receiving the configuration and upon determining that the first unlicensed frequency channel is unavailable for the transmission.

30 Claims, 7 Drawing Sheets

(51) Int. Cl.
H04W 36/38 (2009.01)
H04W 16/14 (2009.01)
(58) Field of Classification Search
CPC ............... H04W 36/36; H04W 36/38; H04W 72/08–087; H04W 74/0808
See application file for complete search history.

(56) References Cited

OTHER PUBLICATIONS

Interdigital Inc (Rapporteur): "Summary of [103#56][NR-U] Connected Mode Mobility (Interdigital)", 3GPP Draft; R2-1814024 (R15 NRU SI AI 11222 103NR56), Mobile Competence Centre ; 650, Oct. 3, 2018. (Year: 2018).*

Interdigital Inc: "Mobility for NR-U", 3GPP Draft, R2-1811455 (R15 NRU SI AI 11222 Mobility) 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018, Aug. 9, 2018 (Aug. 9, 2018), XP051521110, 5 pages, Retrieved from the Internet: URL: http://www.3gpp.org/ftp/tsg%5Fran/WG2%5FRL2/TSGR2%5F103/Docs/R2%2D1811455%2Ezip. [retrieved on Aug. 9, 2018] the whole document.

Interdigital Inc (Rapporteur): "Summary of [103#56] [NR-U] Connected Mode Mobility (InterDigital)", 3GPP Draft, R2-1814024 (R15 NRU SI AI 11222 103NR56), 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Oct. 3, 2018 (Oct. 3, 2018), XP051523485, 12 pages.

Item 2 Continued: Retrieved from the Internet: URL: http://www.3gpp.org/ftp/tsg%5Fran/WG2%5FRL2/TSGR2%5F103bis/Docs/R2%2D1814024%2Ezip. [retrieved on Oct. 3, 2018] pp. 5-6,10.

International Search Report and Written Opinion—PCT/US2020/015923—ISA/EPO—dated May 14, 2020.

LG Electronics Inc: "Channel Occupancy Measurement Enhancements for NR-U", 3GPP Draft, 3GPP TSG-RAN WG2 Meeting #104, R2-1818328, Channel Occupancy Measurement Enhancements for NR-U, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 12, 2018 (Nov. 12, 2018), XP051557824, 2 pages.

Item 5 Continued: Retrieved from the Internet: URL: http://www.3gpp.org/ftp/Meetings%5F3GPP%5FSYNC/RAN2/Docs/R2%2D1818328%2Ezip. [retrieved on Nov. 12, 2018] section 2.

* cited by examiner

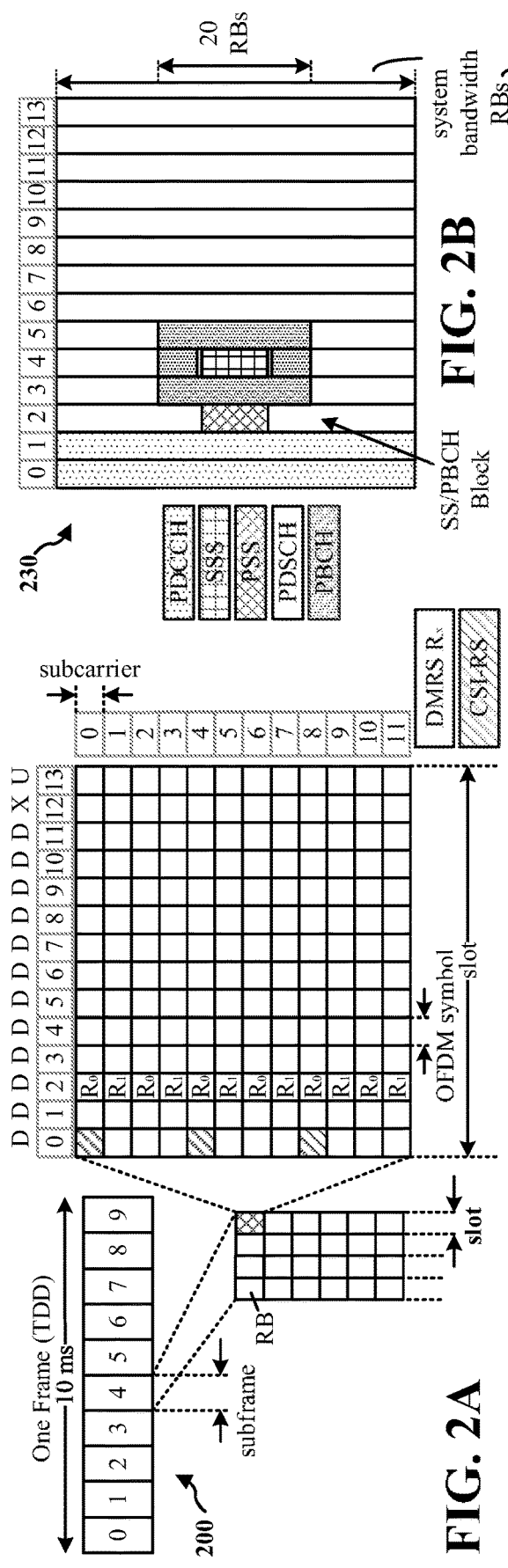
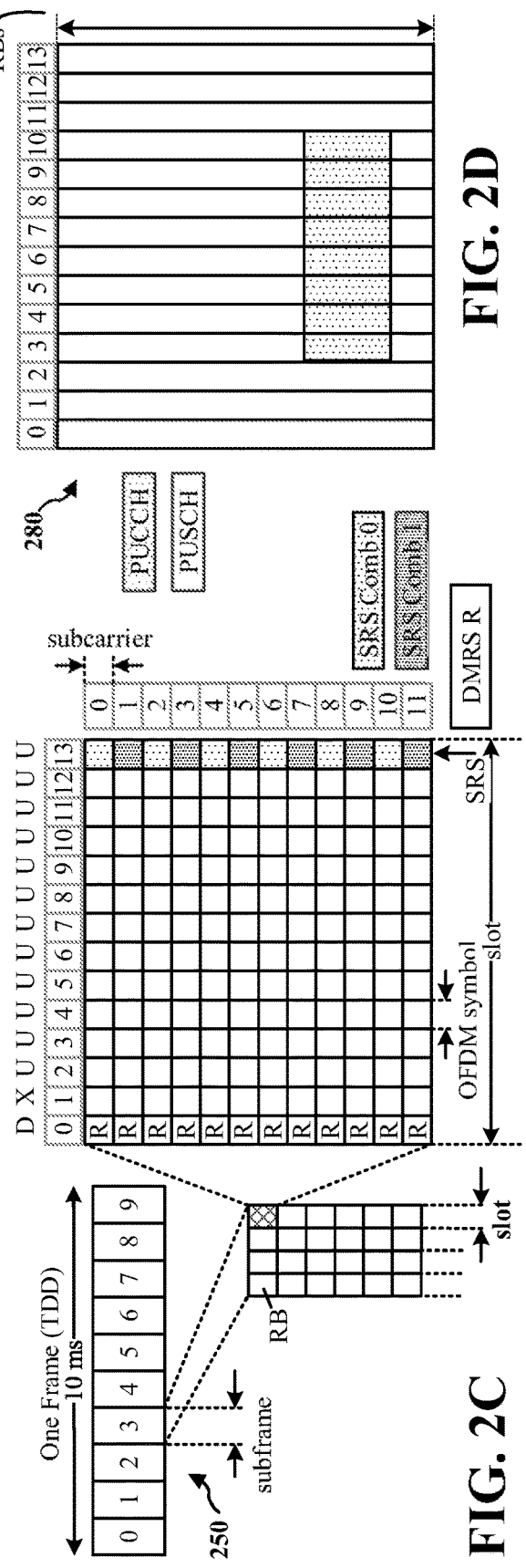
FIG. 2A FIG. 2B FIG. 2C FIG. 2D

HANDOVER AND CELL CHANGE DUE TO CHANNEL ACCESS PROBLEMS

CROSS REFERENCE TO RELATED APPLICATION(S)

This application claims the benefit of U.S. Provisional Application Ser. No. 62/800,253, entitled "HANDOVER AND CELL CHANGE DUE TO CHANNEL ACCESS PROBLEMS" and filed on Feb. 1, 2019, which is expressly incorporated by reference herein in its entirety.

BACKGROUND

Technical Field

The present disclosure relates generally to communication systems, and more particularly, to wireless communication in an unlicensed spectrum.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device, for example, a user equipment (UE). The apparatus receives a configuration from a first base station to perform a conditional handover. The apparatus determines a first unlicensed frequency channel is unavailable for a transmission to the first base station or from the first base station. The apparatus switches from the first unlicensed frequency channel to a second cell for communication through the second cell in the conditional handover upon receiving the configuration and upon determining that the first unlicensed frequency channel is unavailable for the transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
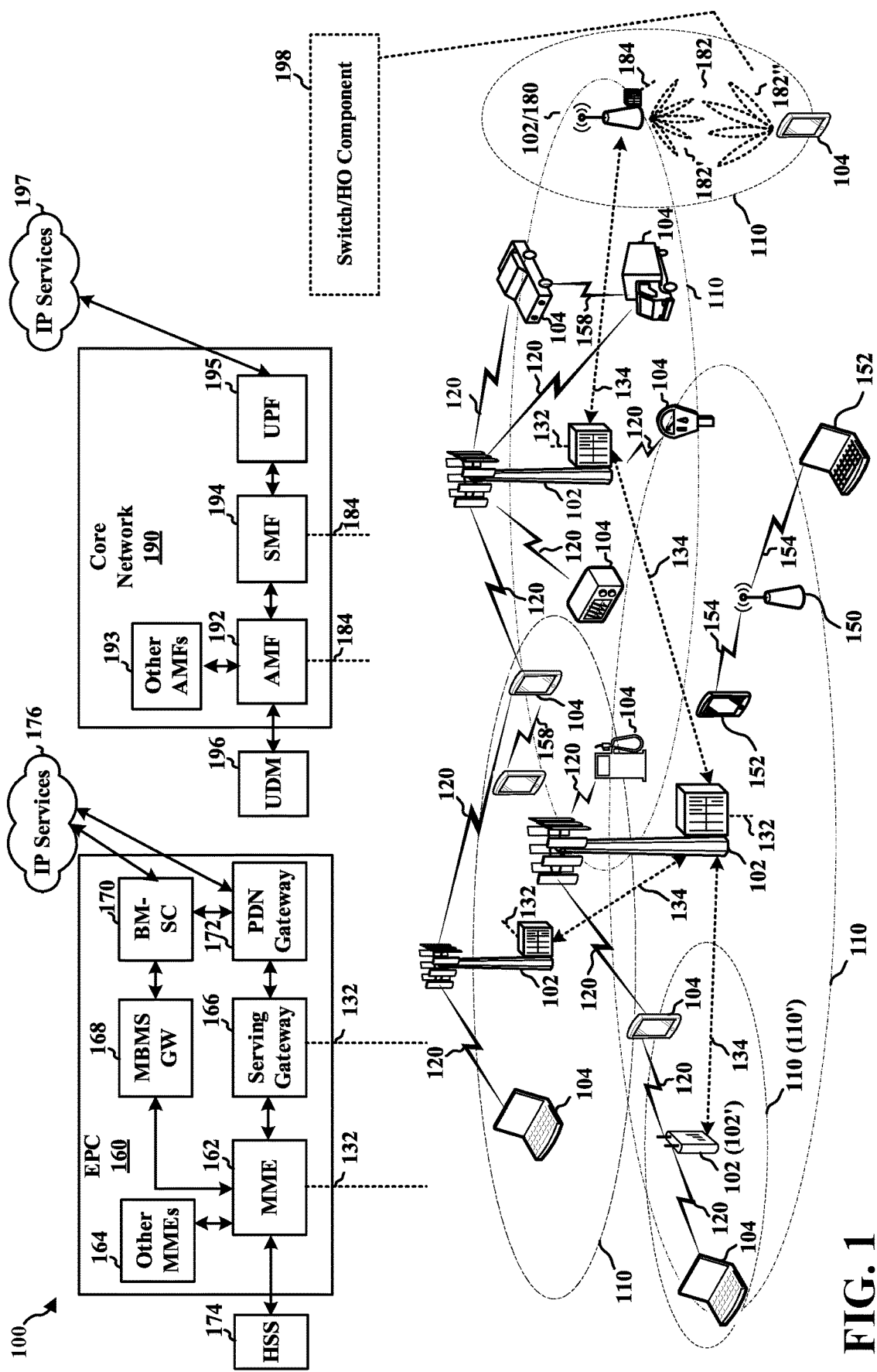
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In wireless communication between a base station and a UE in an unlicensed spectrum, downlink and uplink transmissions may not occur due to listen before talk (LBT) procedure failures. For example, the base station or the UE may not get access to an unlicensed frequency channel. If the channel access problem occurs consistently, the system performance may be degraded.

In order to overcome the channel access problem and to prevent system performance degradation, the present disclosure improves the manner in which the base station may configure the UE to perform a handover (HO) to another cell if the channel access problem happens on a primary cell (PCell) or a primary access cell of secondary Node (PSCell). The base station may also configure the UE to de-activate a secondary cell (SCell) if the problem occurs, as well as to activate another configured SCell. Aspects presented herein improve communication reliability by enabling the base station and/or the UE to get access to an unlicensed frequency channel in a shorter amount of time. Aspects presented herein further improve communication data rate, capacity, and spectral efficiency.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a PCell and a secondary component carrier may be referred to as a SCell.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to obtain access to an unlicensed frequency channel of the unlicensed frequency spectrum in the event of channel access failures. For example, the UE 104 may comprise a switch/HO component 198 configured to switch from the first unlicensed frequency channel to a second cell for communication through the second cell in a conditional handover. The UE 104 may be configured to receive a configuration from the first base station 102/180 for the UE 104 to perform a conditional handover. The UE 104 may be configured to determine a first unlicensed frequency channel is unavailable for a transmission to the first base station or from the first base station. The UE 104 may be configured to switch from the first unlicensed frequency channel to a second cell for communication through the second cell in the conditional handover upon receiving the configuration and upon determining that the first unlicensed frequency channel is unavailable for the transmission.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
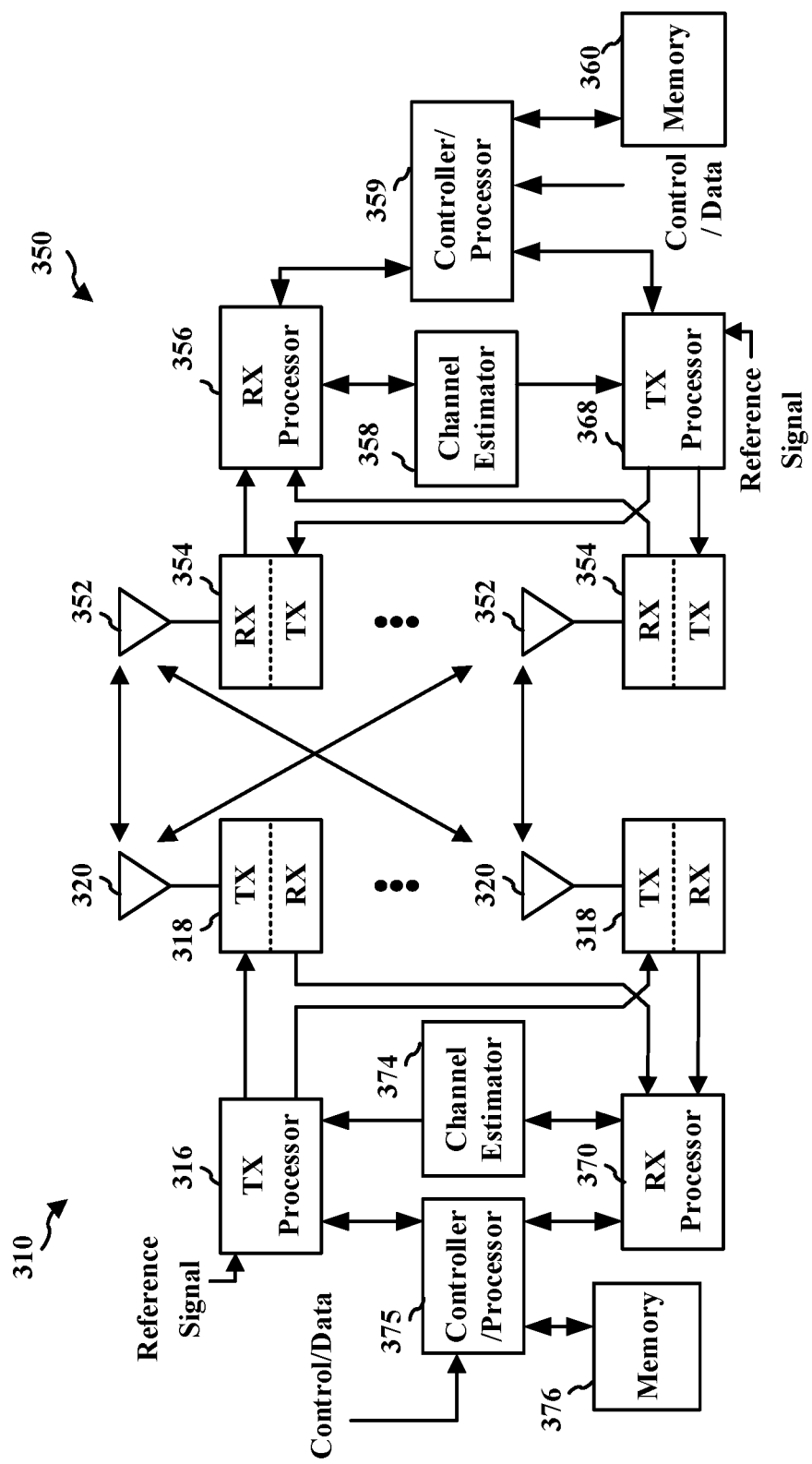
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In wireless communications (e.g., 5G NR or LTE wireless communication) in an unlicensed spectrum, a channel access procedure (e.g., an LBT procedure) may fail because other UEs, other base stations, or other technologies may use an unlicensed channel in the unlicensed spectrum. Thus, downlink and uplink transmissions may not occur due to the LBT procedure failures. For example, a base station 402 or a UE 404 may not be able to get access to the channel. When the LBT procedure fails, the base station 402 or the UE 404 may not get access to the channel, for example, for a long time duration. The channel access problem may degrade system performance, and may further degrade communication data rate, capacity and spectral efficiency.

The present disclosure improves the manner in which a UE may overcome channel access problems, which may assist to prevent system performance degradation.

Figure 4:
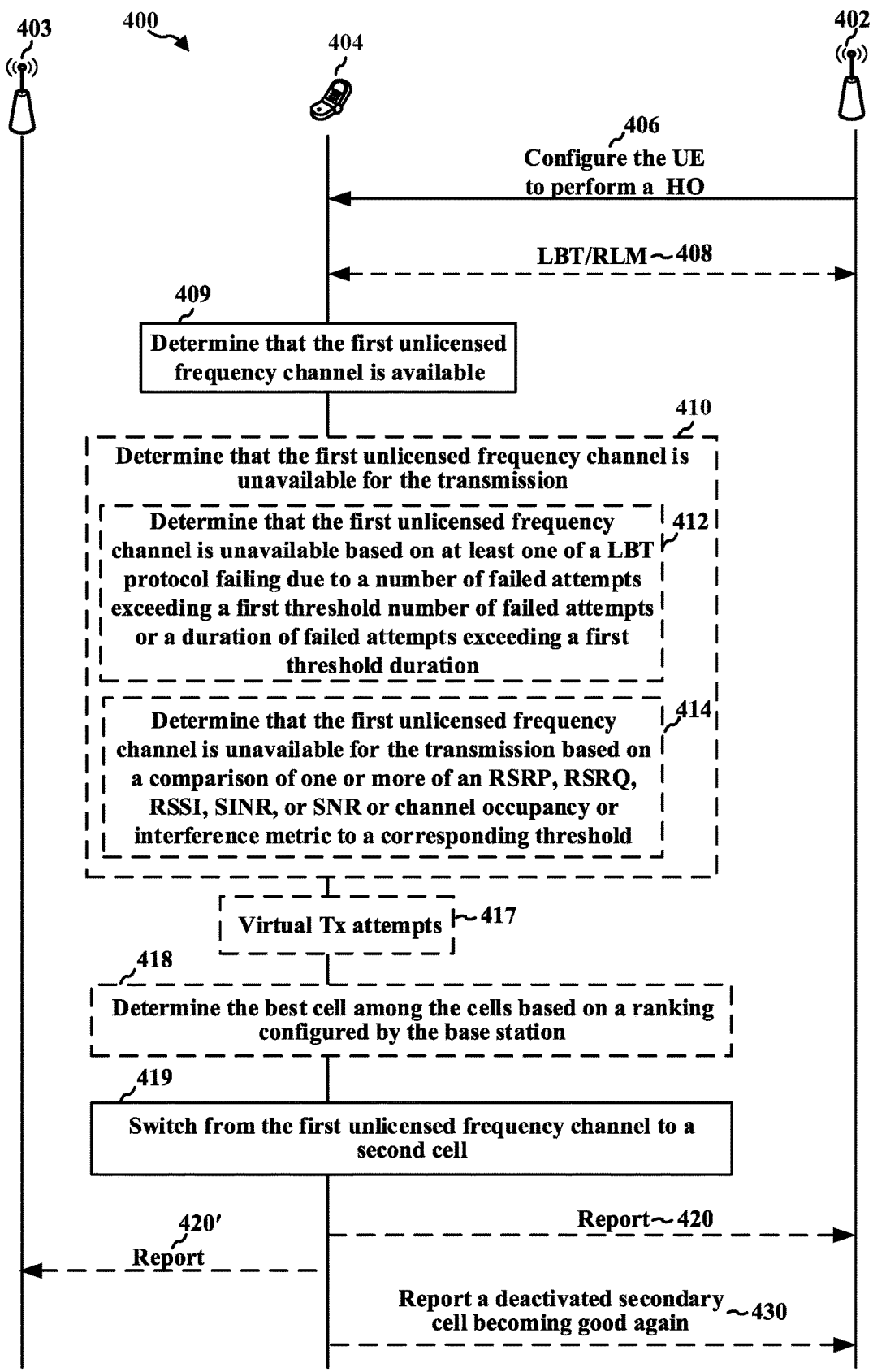
FIG. 4 is a call flow diagram of signaling between a UE and one or more base stations in accordance with certain aspects of the disclosure.

FIG. 4 is an example communication flow 400 between a UE 404 and a base station 402. Optional aspects are illustrated with a dashed line. The base station 402 may provide a cell serving the UE 404. For example, in the context of FIG. 1, the base station 402 may correspond to base station 102/180 and, accordingly, the cell may include a geographic coverage area 110 in which communication coverage is provided and/or small cell 102' having a coverage area 110'. Further, the UE 404 may correspond to at least UE 104. In another example, in the context of FIG. 3, the base station 402 may correspond to the base station 310 and the UE 404 may correspond to the UE 350.

The base station 402, at 406, may configure the UE 404 to perform a handover (e.g., conditional handover) to another cell when channel access problems occur on a PCell or a PSCell. The base station 402 may also configure the UE 404 to de-activate an SCell where the channel access problem occurs as well as activate another configured PCell or PSCell, as illustrated at 406. The UE 404 receives the configuration to perform the conditional handover.

For uplink transmissions, in the LBT procedure, the UE 404 may apply a CCA check prior to transmission. For downlink transmissions, the UE 404 may monitor downlink traffic, as well as reference signals from the base station 402. The UE 404 may perform an LBT or an RLM to check or monitor the channel, as illustrated at 408.

At 409, the UE 404 may determine whether a first unlicensed frequency channel is available. The UE may determine whether the first unlicensed frequency channel is available for a transmission to the base station 402 or for a transmission from the base station 402. In some aspects, such as when the first unlicensed frequency channel is available, the UE 404 may utilize the first unlicensed frequency channel to transmit the transmission to the base station 402 or to receive the transmission from the first base station 402.

In some aspects, for example at 410, the UE 404 may determine that the first unlicensed frequency channel may be unavailable for the transmission. In some aspects, the UE 404 may determine the conditions that may cause the first unlicensed frequency channel to be unavailable for the transmission.

In some aspects, for example at 412, the UE to determine that the first unlicensed frequency channel may be unavailable for the transmission, the UE 404 may determine that the first unlicensed frequency channel may be unavailable for the transmission based on LBT protocol failures. In some aspects, the UE 404 may determine that the first unlicensed frequency channel may be unavailable for the transmission based on at least one of the LBT protocol failing due to a number of failed attempts exceeding a first threshold number of failed attempts or a duration of failed attempts exceeding a first threshold duration. In some aspects, the transmission may be one of a SR, a RACH procedure, data on a PUSCH, or SRS on the first unlicensed frequency channel. For example, for uplink, the base station 402 may configure the UE 404 with a first number of maximum transmission attempts and/or a first configured maximum duration. The UE 404 may trigger the report when LBT procedure fails for transmission attempts. In some aspects, the transmission attempts may include transmission attempts for SR, RACH, PUSCH, or SRS. The transmission attempts may include other types of transmission attempts as well, and is not intended to be limited to the aspects provided herein.

In some aspects, the UE 404 may maintain one or more counters associated with the number of failed attempts or one or more timers associated with the duration of failed attempts based on the LBT protocol to transmit one or more of the SR, the RACH, the PUSCH, or the SRS on the first unlicensed frequency channel. In some aspects, each failed attempt may correspond to a determination that the first unlicensed frequency channel may be unavailable for transmission. In some aspects, the UE 404 may reset the one or more counters or the one or more timers upon a successful attempt based on the LBT protocol to transmit one or more of the SR, the RACH, the PUSCH, or the SRS on the first unlicensed frequency channel. The successful attempt may correspond to a determination that the first unlicensed frequency channel may be available for the transmission. For example, the UE 404 may trigger the report after the transmission attempts for SR, RACH, PUSCH, or SRS fail a configured first maximum number of attempts or a configured first maximum duration. As an example, when a transmission attempt fails, a counter and/or timer may be triggered. The counter and/or timer may start counting or running. After a successful attempt, the counter and/or timer may be reset. The counter may increment by 1 after each failed attempt, and the timer may increase after each failed attempt, until the counter and/or timer reaches a first configured maximum number of attempts and/or a first configured maximum duration. The first configured maximum duration may be a duration from the timer being triggered until a successful transmission. For example, the first configured maximum duration may be a duration of a total duration of the failed attempts. In some aspects, the failed attempt may be due to LBT procedure failure.

For uplink transmissions, the base station 402 may configure the UE 404 with a first number of maximum transmission attempts and/or a first configured maximum duration. The UE 404 may trigger the report when LBT procedure fails for transmission attempts. For example, the transmission attempts may include transmission attempts for scheduling request (SR), random access channel (RACH), PUSCH, or SRS. The transmission attempts may include other types of transmission attempts as well.

For example, the UE 404 may trigger the report after the transmission attempts for SR, RACH, PUSCH, or SRS fail a configured first maximum number of attempts or a configured first maximum duration, as illustrated at 412. As an example, when a transmission attempt fails, a counter and/or timer may be triggered. The counter and/or timer may start counting or running. After a successful attempt, the counter and/or timer may be reset. The counter may increment by 1 after each failed attempt, and the timer may increase after each failed attempt, until reach a first configured maximum number of attempts and/or a first configured maximum duration. The first configured maximum duration may be a duration from the timer being triggered until a successful transmission. For example, the first configured maximum duration may be a duration of a total duration of the failed attempts. For example, the failed attempt may be due to LBT procedure failure.

In some aspects, for an SR transmission, the first configured maximum number of attempts, the first configured maximum duration, the counter, and/or the timer may be different if SR is inside or outside a transmission opportunity (TXOP). TXOP refers to the amount of time a base station can send frames when the base station has won contention for the wireless medium. For example, TXOP may correspond to a transmission duration reserved by the base station after LBT being successful. When SR is inside the TXOP, the base station 402 has already contended for the channel. For the duration of TXOP, the base station 402 has already obtained access to the channel. Thus, when SR is inside the TXOP, the UE 404 may have an LBT procedure with a minimum duration. For example, when SR is inside the TXOP, the UE 404 may have the LBT with a duration of 25 µs. When SR is outside the TXOP, the UE 404 has to contend for the channel, thus the UE 404 may have an LBT with a different duration, based on a contention window. Therefore, the UE 404 may have different first configured maximum numbers, first maximum durations, counters, and/or timers if SR is inside or outside the TXOP. Further, for RACH, PUSCH, or SRS transmission attempt, if the RACH, PUSCH, or SRS transmission attempt is inside or outside the TXOP, there may be different first configured maximum numbers, first maximum durations, counters, or timers as well.

In some aspects, separate first configured maximum numbers, first configured maximum durations, counters, and/or timers may be used for different access priorities. To provide differentiation to channel access priorities based on the type of traffic served, there may be different priority classes. For example, there may be four LBT priority classes, 1, 2, 3, or 4, while 1 being the highest. Different LBT priority classes may have different contention window sizes (CWS). Each access priority may have a corresponding maximum and minimum CWS. For example, higher access priority may have a lower maximum CWS. The highest access priority may have the lowest maximum CWS. For example, the lowest maximum contention window size may be 25 µs. The UE 404 may track different priority classes differently. For example, each access priority may have a corresponding first configured maximum number, duration, counter, and/or timer. For example, the counters and/or timers for higher access priorities may also be reset when a counter and/or a timer for an access priority is reset.

In some aspects, the first configured maximum number of attempts and/or a first configured maximum duration may be different and smaller than the existing one which triggers a radio link failure (RLF).

In some aspects, for example at 414, to determine that the first unlicensed frequency channel may be unavailable for the transmission, the UE 404 may determine that the first unlicensed frequency channel may be unavailable for the transmission based on a comparison of one or more signals. In some aspects, the UE 404 may determine that the first unlicensed frequency channel may be unavailable for the transmission based on a comparison of one or more of a RSRP, a RSRQ, a RSSI, a SINR, a SNR, or a channel occupancy or interference metric to a corresponding threshold. In some aspects, to determine that the first unlicensed frequency channel may be unavailable for the transmission based on a comparison of one or more signals, the UE 404 may maintain one or more counters associated with a number of occasions when one or more of the RSRP, the RSRQ, the SINR, or the SNR is less than the corresponding threshold within a monitoring duration, or when one or more of the RSSI or the channel occupancy or interference metric is greater than the corresponding threshold within the monitoring duration. In some aspects, the UE may determine that the first unlicensed frequency channel may be unavailable for the transmission based on the number of occasions that exceed a threshold number of occasions within the monitoring duration. For example, for downlink, the UE 404 may determine that the channel is not available and trigger a report when RSRP, RSRQ, RSSI, SINR, SNR or a channel occupancy or interference metric is above or below a corresponding threshold for an amount of time where the UE counts the number of occasions when the reference signals are missed, e.g., when RSRP<the RSPP threshold, or RSRQ<the RSRQ threshold, or RSSI>the RSSI threshold, or SINR<the SINR threshold, or SNR<the SNR threshold, or the channel occupancy or interference metric>the channel occupancy or interference metric threshold within a duration (per cell or per sub-band). The base station 402 may configure the UE 404 to report to the base station 402 when RSRP, RSRQ, RSSI, SINR, SNR or a channel occupancy or interference metric is above or below a corresponding threshold for an amount of time. The UE 404 may count the number of occasions when the reference signals are missed, e.g., when RSRP<the RSPP threshold, or RSRQ<the RSRQ threshold, or RSSI>the RSSI threshold, or SINR<the SINR threshold, or SNR<the SNR threshold, or the channel occupancy or interference metric>the channel occupancy or interference metric threshold within the duration (per cell or per sub-band).

In some aspects, a counter may be triggered when RSRP<the RSPP threshold, or RSRQ<the RSRQ threshold, or RSSI>the RSSI threshold, or SINR<the SINR threshold. The UE 404 may count the number of occasions when the reference signals are missed, e.g., when RSRP<the RSPP threshold, or RSRQ<the RSRQ threshold, or RSSI>the RSSI threshold, or SINR<the SINR threshold, or SNR<a threshold, or a channel occupancy or interference metric>a threshold within the duration. The issue may occur at any cell or sub-band, and the UE 404 may count the number of occasions per cell or per sub-band. If the number of occasions exceeds the threshold number for the counter, the UE 404 may send the report to the base station. In some aspects, the UE 404 may send the report to the base station based on a percentage of a time corresponds to the number of occasions when the reference signals are missed over the duration of the monitoring time.

In some aspects, the duration of the monitoring may be configured. The base station 402 may configure the UE 404 to monitor the channel for an amount of time duration. In some aspects, a threshold for the counter may be configured. The base station 402 may configure the UE 404 to report when the number of occasions that RSRP<the RSPP threshold, or RSRQ<the RSRQ threshold, or RSSI>the RSSI threshold, or SINR<the SINR threshold, or SNR<the threshold, or a channel occupancy or interference metric>the channel occupancy or interference metric threshold exceeds a threshold number of occasions, within the duration (per cell or per sub-band).

In some aspects, the actual symbols/slots to measure can be configured. The actual symbols/slots are the reference signal, such as a synchronization signal block (SSB), or a channel state information reference signal (CSI-RS), etc. The base station 402 may configure the UE 404 which reference signal is to be measured, for example, the SSB, or the CSI-RS, etc.

In some aspects, when the base station 402 accesses the channel, the base station 402 may report missing RS symbols. The base station 402 may inform the UE 404 that the base station was not able to transmit the RS symbols. In such instances, the base station 402 may configure the UE to not account for these missing symbols that the base station may have reported in the UE's counting. In the UE's report, the UE 404 may report the missing reference signals not reported by the base station, which may due to the hidden nodes and/or interference issue that the base station 402 may not know about. In this case, the channel may be good, but the interference due to the hidden nodes (e.g., a WiFi nearby is interfering) may be large, but the base station 402 may not be aware of this issue.

In some aspects, for example at 417, the UE 404 may perform one or more virtual transmission attempts. The UE 404 may perform the one or more virtual transmission attempts in a periodic manner. In a virtual transmission attempt, the UE 404 does not have any data to transmit, but instead the UE 404 performs LBT without actual data to transmit in order to determine the quality of the channel. In some aspects, the UE 404 may be configured to perform the virtual transmission attempt with a first periodicity for a first type of transmission attempt. In some aspects, the UE 404 may be configured to perform the virtual transmission attempt with a second periodicity for a second type of transmission attempt. The first type of the transmission attempt may be inside a transmission opportunity contended for and provided by the first base station. The second type of the transmission attempt may be outside the transmission opportunity contended for and provided by the first base station. The second type of the transmission attempt may be transmitted within a transmission opportunity contended for by the UE 404. For example, the UE 404 may perform virtual transmission attempts. In some instances, the UE may wait to perform LBT until transmission data arrives, which may be too late and cause a delay in sending the data. In some aspects, the UE 404 may sense the channel beforehand. For example, the base station 402 may configure the UE 404 to sense the channel to determine if the channel quality is good, even if there is no actual data, e.g. every 100 ms. In this way, when actual data comes, the UE performing LBT will not be too late. Virtual transmission attempts refer to the UE performing LBT without actual data to transmit. Virtual transmission attempts may be performed when there are not sufficient actual uplink attempts. In some aspects, the UE 404 may be configured to perform virtual transmission attempts periodically. In some aspects, virtual transmission attempts may be performed separate/conditional within or outside the TXOP. For example, the UE may perform a virtual transmission attempt when the TXOP starts, periodically within TXOP, and/or with a separate periodicity outside the TXOP.

In some aspects, for example at 418, the UE 404 may determine the best cell among the cells based on a ranking configured by the base station 402. In some aspects, the ranking may be based on a combination of channel quality and channel load metrics. In some aspects, the ranking may be based on a priority configured by the base station 402. For example, the base station 402 may give priority to configured SCells, its own cells, or other base stations (e.g., 403) with less load. In some aspects, the ranking may also be in terms of LBT success events including virtual attempts on these frequencies. In some aspects, the ranking may be based on success events of the LBT protocol for the second cell. For example, the UE 404 may perform a handover to the best cell among the cells configured by the base station 402. In some aspects, the UE 404 may deactivate a cell and activate a second cell. In some aspects, the UE 404 may move to a cell of a second base station 403 in the handover. Once the event has been triggered, the UE 404 may perform the handover to the best cell among the cells based on a ranking configured by the base station 402.

At 419, the UE 404 may switch from the first unlicensed frequency channel to a second cell. The UE 404 may switch from the first unlicensed frequency channel to the second cell for communication through the second cell in the conditional handover upon receiving the configuration and upon the determination that the first unlicensed frequency channel may be unavailable for the transmission. In some aspects, the first unlicensed frequency channel may be associated with a first primary cell of the base station 402. In some aspects, the second cell may be associated with a first primary cell of a second base station 403 or a second primary cell of the base station 402, such that the UE 404 switching from the first unlicensed frequency channel to the second cell for communication may comprise moving from the first primary cell of the base station 402 to the first primary cell of the second base station 403 or a second primary cell of the base station 402. In some aspects, the first unlicensed frequency channel may be associated with a first secondary cell of the base station 402. In some aspects, the second cell may be associated with a second secondary cell of the base station 402, such that the UE switching from the first unlicensed frequency channel may comprise deactivating the first secondary cell of the base station 402. The second cell may include an unlicensed frequency channel that was previously deactivated due to a failure of a previous transmission. In some aspects, the base station 402 may be a secondary node, such that the first unlicensed frequency channel may be associated with a primary cell of the secondary node, and the second cell may be associated with another primary cell of the secondary node In some aspects, for example at 420, the UE 404 may send a report to the base station 402. The UE 404 may send the report to the base station 402 to indicate the failure of the transmission upon the determination that the first unlicensed frequency channel is unavailable for the transmission. In some aspects, the report may be sent by the UE 404 to the base station 402 through a unicast RRC message or a MAC-CE. In some aspects, the report may be sent as part of a set of reports, where each report in the set of reports may be sent periodically to the first base station. For example, when an SCell experiences channel access problems, the UE 404 may deactivate the SCell and report the channel access problem to the base station 402 in an RRC message or as a MAC-CE via another cell, as shown at 420. The UE 404 may send the report to the base station 403, as shown at 420'. In instances where an SCell was previously deactivated due to the channel access problem, the UE 404 may continue to perform measurements, possibly at a reduced rate in comparison to an activated cell. The UE 404 may use virtual attempts on deactivated cells. The UE 404 may activate the deactivated SCell when the metrics discussed above for LBT failure and/or channel quality metrics pass the configured thresholds. The UE may report the information that the cell becoming good again to the base station as an RRC message or as an MAC, as illustrated at 430.

Figure 5:
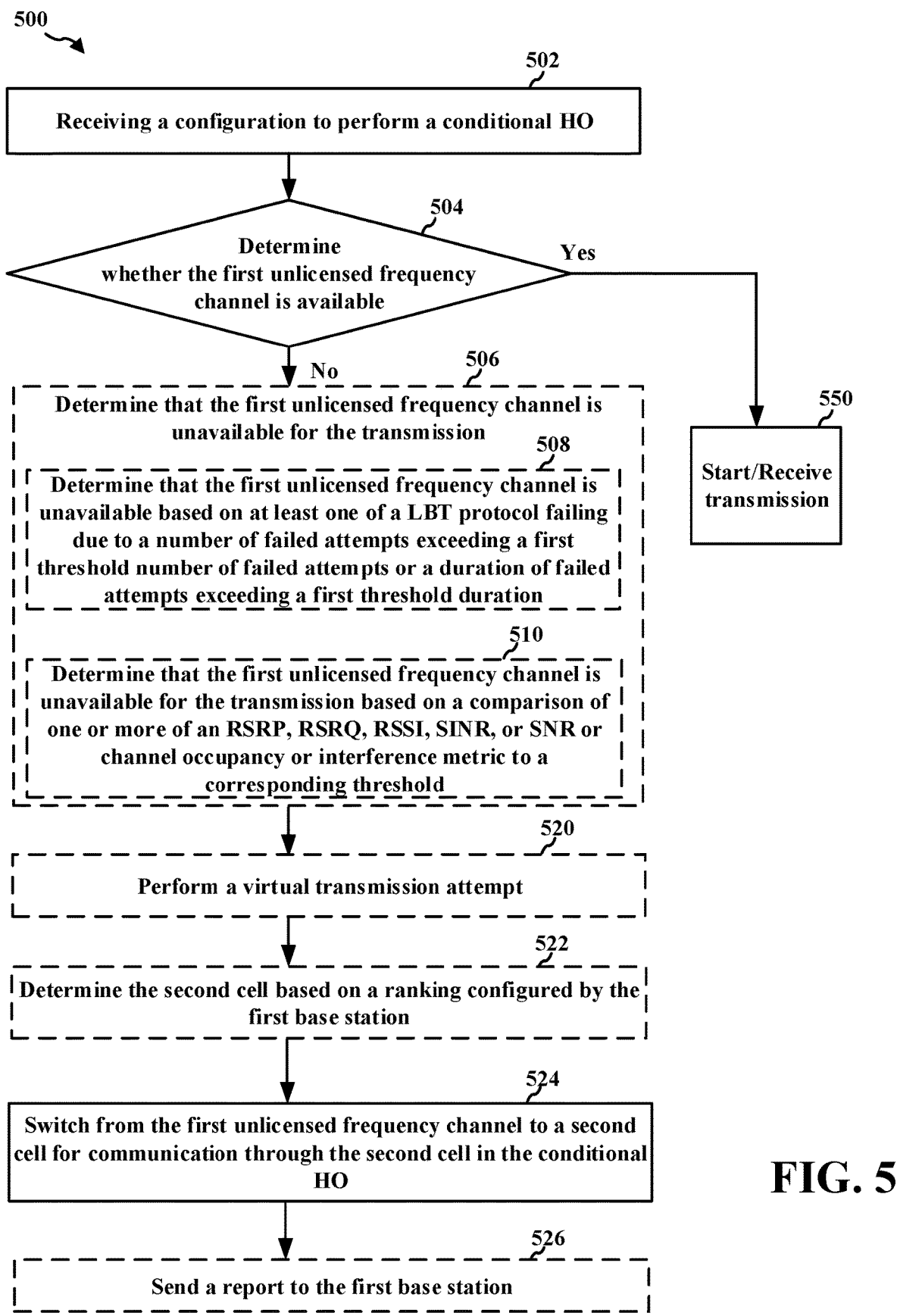
FIG. 5 is a flowchart of a method of wireless communication.

FIG. 5 is a flowchart of a method 500 of wireless communication. The method may be performed by a UE or a component of a UE (e.g., the UE 104, 350, 404; the apparatus 602/602'; the processing system 714, which may include the memory 360 and which may be the entire UE 350 or a component of the UE 350, such as the TX processor 368, the RX processor 356, and/or the controller/processor 359). According to various aspects, one or more of the illustrated operations of method 500 may be omitted, transposed, and/or contemporaneously performed. Optional aspects are illustrated with a dashed line. The method may enable a UE to obtain access to an unlicensed frequency channel of the unlicensed frequency spectrum in a shorter time duration. The method may improve communication reliability, as well as communication data rate, capacity, and spectral efficiency.

At 502, the UE may receive a configuration to perform a conditional handover. For example, 502 may be performed by configuration component 606 of apparatus 602. The UE may receive the configuration to perform the conditional handover from a first base station. For example, referring to FIG. 4, the base station 402 may configure the UE 404 to perform a handover to another cell or activate another cell under some conditions without waiting for an instruction from the base station. This handover may be referred to as a conditional handover.

At 504, the UE may determine whether a first unlicensed frequency channel is available. For example, 504 may be performed by determination component 608 of apparatus 602. The UE may determine whether the first unlicensed frequency channel is available for a transmission to the first base station or for a transmission from the first base station. In some aspects, such as when the first unlicensed frequency channel is available, the UE may utilize, at 550, the first unlicensed frequency channel to transmit the transmission to the first base station or to receive the transmission from the first base station.

In some aspects, for example at 506, the UE may determine that the first unlicensed frequency channel may be unavailable for the transmission. For example, 506 may be performed by determination component 608 of apparatus 602. In some aspects, the UE may determine the conditions that may cause the first unlicensed frequency channel to be unavailable for the transmission.

In some aspects, for example at 508, to determine that the first unlicensed frequency channel may be unavailable for the transmission, the UE may determine that the first unlicensed frequency channel may be unavailable for the transmission based on LBT protocol failures. For example, 508 may be performed by LBT component 610 of apparatus 602. In some aspects, the UE may determine that the first unlicensed frequency channel may be unavailable for the transmission based on at least one of the LBT protocol failing due to a number of failed attempts exceeding a first threshold number of failed attempts or a duration of failed attempts exceeding a first threshold duration. In some aspects, the transmission may be one of a SR, a RACH procedure, data on a PUSCH, or SRS on the first unlicensed frequency channel. For example, with reference to FIG. 4, for uplink, the base station 402 may configure the UE 404 with a first number of maximum transmission attempts and/or a first configured maximum duration. The UE 404 may trigger the report when LBT procedure fails for transmission attempts. In some aspects, the transmission attempts may include transmission attempts for SR, RACH, PUSCH, or SRS. The transmission attempts may include other types of transmission attempts as well, and is not intended to be limited to the aspects provided herein.

In some aspects, the UE may maintain one or more counters associated with the number of failed attempts or one or more timers associated with the duration of failed attempts based on the LBT protocol to transmit one or more of the SR, the RACH, the PUSCH, or the SRS on the first unlicensed frequency channel. In some aspects, each failed attempt may correspond to a determination that the first unlicensed frequency channel may be unavailable for transmission. In some aspects, the UE may reset the one or more counters or the one or more timers upon a successful attempt based on the LBT protocol to transmit one or more of the SR, the RACH, the PUSCH, or the SRS on the first unlicensed frequency channel. The successful attempt may correspond to a determination that the first unlicensed frequency channel may be available for the transmission. For example, with reference to FIG. 4, the UE 404 may trigger the report after the transmission attempts for SR, RACH, PUSCH, or SRS fail a configured first maximum number of attempts or a configured first maximum duration, as illustrated at 412. As an example, when a transmission attempt fails, a counter and/or timer may be triggered. The counter and/or timer may start counting or running. After a successful attempt, the counter and/or timer may be reset. The counter may increment by 1 after each failed attempt, and the timer may increase after each failed attempt, until the counter and/or timer reaches a first configured maximum number of attempts and/or a first configured maximum duration. The first configured maximum duration may be a duration from the timer being triggered until a successful transmission. For example, the first configured maximum duration may be a duration of a total duration of the failed attempts. In some aspects, the failed attempt may be due to LBT procedure failure.

In some aspects, for example at 510, to determine that the first unlicensed frequency channel may be unavailable for the transmission, the UE may determine that the first unlicensed frequency channel may be unavailable for the transmission based on a comparison of one or more signals. For example, 510 may be performed by comparison component 612 of apparatus 602. In some aspects, the UE may determine that the first unlicensed frequency channel may be unavailable for the transmission based on a comparison of one or more of a RSRP, a RSRQ, a RSSI, a SINR, a SNR, or a channel occupancy or interference metric to a corresponding threshold.

In some aspects, to determine that the first unlicensed frequency channel may be unavailable for the transmission based on a comparison of one or more signals, the UE may maintain one or more counters associated with a number of occasions when one or more of the RSRP, the RSRQ, the SINR, or the SNR is less than the corresponding threshold within a monitoring duration, or when one or more of the RSSI or the channel occupancy or interference metric is greater than the corresponding threshold within the monitoring duration. In some aspects, the UE may determine that the first unlicensed frequency channel may be unavailable for the transmission based on the number of occasions that exceed a threshold number of occasions within the monitoring duration. For example, with reference to FIG. 4, for downlink, the UE 404 may determine that the channel is not available and trigger a report when RSRP, RSRQ, RSSI, SINR, SNR or a channel occupancy or interference metric is above or below a corresponding threshold for an amount of time where the UE counts the number of occasions when the reference signals are missed, e.g., when RSRP<the RSPP threshold, or RSRQ<the RSRQ threshold, or RSSI>the RSSI threshold, or SINR<the SINR threshold, or SNR<the SNR threshold, or the channel occupancy or interference metric>the channel occupancy or interference metric threshold within a duration (per cell or per sub-band), as illustrated at 414. The base station 402 may configure the UE 404 to report to the base station 402 when RSRP, RSRQ, RSSI, SINR, SNR or a channel occupancy or interference metric is above or below a corresponding threshold for an amount of time. The UE 404 may count the number of occasions when the reference signals are missed, e.g., when RSRP<the RSPP threshold, or RSRQ<the RSRQ threshold, or RSSI>the RSSI threshold, or SINR<the SINR threshold, or SNR<the SNR threshold, or the channel occupancy or interference metric>the channel occupancy or interference metric threshold within the duration (per cell or per sub-band).

In some aspects, for example at 520, the UE may perform a virtual transmission attempt. For example, 520 may be performed by virtual tx component 614 of apparatus 602. The UE may perform the virtual transmission attempt in a periodic manner. In the virtual transmission attempt, the UE does not have any data to transmit, but instead the UE performs LBT without actual data to transmit in order to determine the quality of the channel. In some aspects, the UE may be configured to perform the virtual transmission attempt with a first periodicity for a first type of transmission attempt. In some aspects, the UE may be configured to perform the virtual transmission attempt with a second periodicity for a second type of transmission attempt. The first type of the transmission attempt may be inside a transmission opportunity contended for and provided by the first base station. The second type of the transmission attempt may be outside the transmission opportunity contended for and provided by the first base station. The second type of the transmission attempt may be transmitted within a transmission opportunity contended for by the UE. For example, with reference to FIG. 4, the UE 404 may perform virtual transmission attempts. In some instances, the UE may wait to perform LBT until the UE has actual data for transmission and may perform the LBT too late. In some aspects, the UE 404 may sense the channel beforehand. For example, the base station 402 may configure the UE 404 to sense the channel to determine if the channel quality is good, even if there is no actual data, e.g. every 100 ms. In this way, when actual data comes, the UE performing LBT will not be too late. Virtual transmission attempts refer to the UE performing LBT without actual data to transmit. Virtual transmission attempts may be performed when there are not sufficient actual uplink attempts. In some aspects, the UE 404 may be configured to perform virtual transmission attempts periodically. In some aspects, virtual transmission attempts may be performed separate/conditional within or outside the TXOP. For example, the UE may perform a virtual transmission attempt when the TXOP starts, periodically within TXOP, and/or with a separate periodicity outside the TXOP.

In some aspects, for example at 522, the UE may determine the second cell based on a ranking. For example, 522 may be performed by rank component 616 of apparatus 602. The UE may determine the second cell based on a ranking configured by the first base station. In some aspects, the ranking may be based on a combination of channel quality and channel load metrics. In some aspects, the ranking may be based on a priority configured by the first base station. For example, the base station 402 may give priority to configured SCells, its own cells, or other base stations with less load. In some aspects, the ranking may also be in terms of LBT success events including virtual attempts on these frequencies. In some aspects, the ranking may be based on success events of the LBT protocol for the second cell. For example, with reference to FIG. 4, at 418, the UE 404 may perform a handover to the best cell among the cells configured by the base station 402. In some aspects, the UE 404 may deactivate a cell and activate a second cell. In some aspects, the UE may move to a cell of a second base station 403 in the handover. Once the event has been triggered, the UE 404 may perform the handover to the best cell among the cells based on a ranking configured by the base station 402.

At 524, the UE may switch from the first unlicensed frequency channel to a second cell. For example, 524 may be performed by switch component 618 of apparatus 602. The UE may switch from the first unlicensed frequency channel to the second cell for communication through the second cell in the conditional handover upon receiving the configuration and upon the determination that the first unlicensed frequency channel may be unavailable for the transmission. In some aspects, the first unlicensed frequency channel may be associated with a first primary cell of the first base station. In some aspects, the second cell may be associated with a first primary cell of a second base station or a second primary cell of the first base station, such that the UE switching from the first unlicensed frequency channel to the second cell for communication may comprise moving from the first primary cell of the first base station to the first primary cell of the second base station or a second primary cell of the first base station. In some aspects, the first unlicensed frequency channel may be associated with a first secondary cell of the first base station. In some aspects, the second cell may be associated with a second secondary cell of the first base station, such that the UE switching from the first unlicensed frequency channel may comprise deactivating the first secondary cell of the first base station. The second cell may include an unlicensed frequency channel that was previously deactivated due to a failure of a previous transmission. In some aspects, the first base station may be a secondary node, such that the first unlicensed frequency channel may be associated with a primary cell of the secondary node, and the second cell may be associated with another primary cell of the secondary node.

In some aspects, for example at 526, the UE may send a report to the first base station. For example, 526 may be performed by report component 620 of apparatus 602. The UE may send the report to the first base station to indicate the failure of the transmission upon the determination that the first unlicensed frequency channel is unavailable for the transmission. In some aspects, the report may be sent by the UE to the first base station through a unicast RRC message or a MAC-CE. In some aspects, the report may be sent as part of a set of reports, where each report in the set of reports may be sent periodically to the first base station. For example, with reference to FIG. 4, when an SCell experiences channel access problems, the UE 404 may deactivate the SCell and report the channel access problem to the base station 402 in an RRC message or as a MAC-CE via another cell, as shown at 420. The UE 404 may send the report to the base station 403, as shown at 420'. In instances where an SCell was previously deactivated due to the channel access problem, the UE 404 may continue to perform measurements, possibly at a reduced rate in comparison to an activated cell. The UE 404 may use virtual attempts on deactivated cells. The UE 404 may activate the deactivated SCell when the metrics discussed above for LBT failure and/or channel quality metrics pass the configured thresholds. The UE may report the information that the cell becoming good again to the base station as an RRC message or as an MAC, as illustrated at 430.

Figure 6:
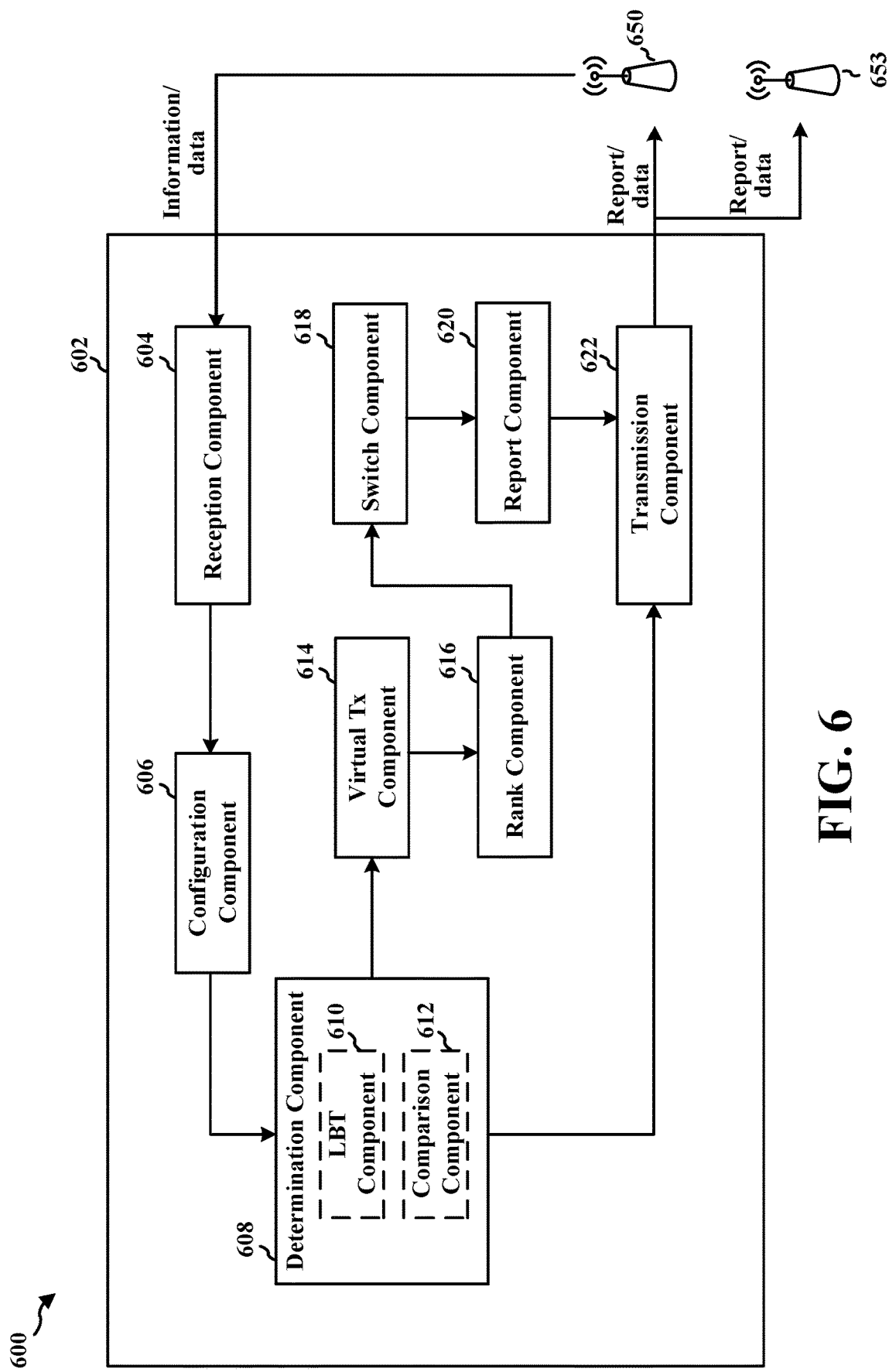
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be a UE or a component of a UE. The apparatus includes a reception component 604 that may be configured to receive various types of signals/messages and/or other information from other devices, including, for example, the base station 650. The apparatus includes a configuration component 606 configured to receive a configuration to perform a conditional handover, e.g., as described in connection with 502 of FIG. 5. The apparatus includes a determination component 608 configured to determine whether a first unlicensed frequency channel is available, e.g., as described in connection with 504 of FIG. 5. The determination component 608 may also be configured to determine that the first unlicensed frequency channel may be unavailable for the transmission, e.g., as described in connection with 506 of FIG. 5. The apparatus includes an LBT component 610 configured to determine that the first unlicensed frequency channel may be unavailable for the transmission based on LBT protocol failures, e.g., as described in connection with 508 of FIG. 5. The apparatus includes a comparison component 612 configured to determine that the first unlicensed frequency channel may be unavailable for the transmission based on a comparison of one or more signals, e.g., as described in connection with 510 of FIG. 5. The apparatus includes a virtual tx component 614 configured to perform a virtual transmission attempt, e.g., as described in connection with 520 of FIG. 5. The apparatus includes a rank component 616 configured to determine the second cell based on a ranking, e.g., as described in connection with 522 of FIG. 5. The apparatus includes a switch component 618 configured to switch from the first unlicensed frequency channel to a second cell, e.g., as described in connection with 524 of FIG. 5. The apparatus includes a report component 620 configured to send a report to the first base station, e.g., as described in connection with 526 of FIG. 5. The apparatus includes a transmission component 622 configured to transmit various types of signals/messages and/or other information to other devices, including, for example, the base station 650 and/or 653.

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
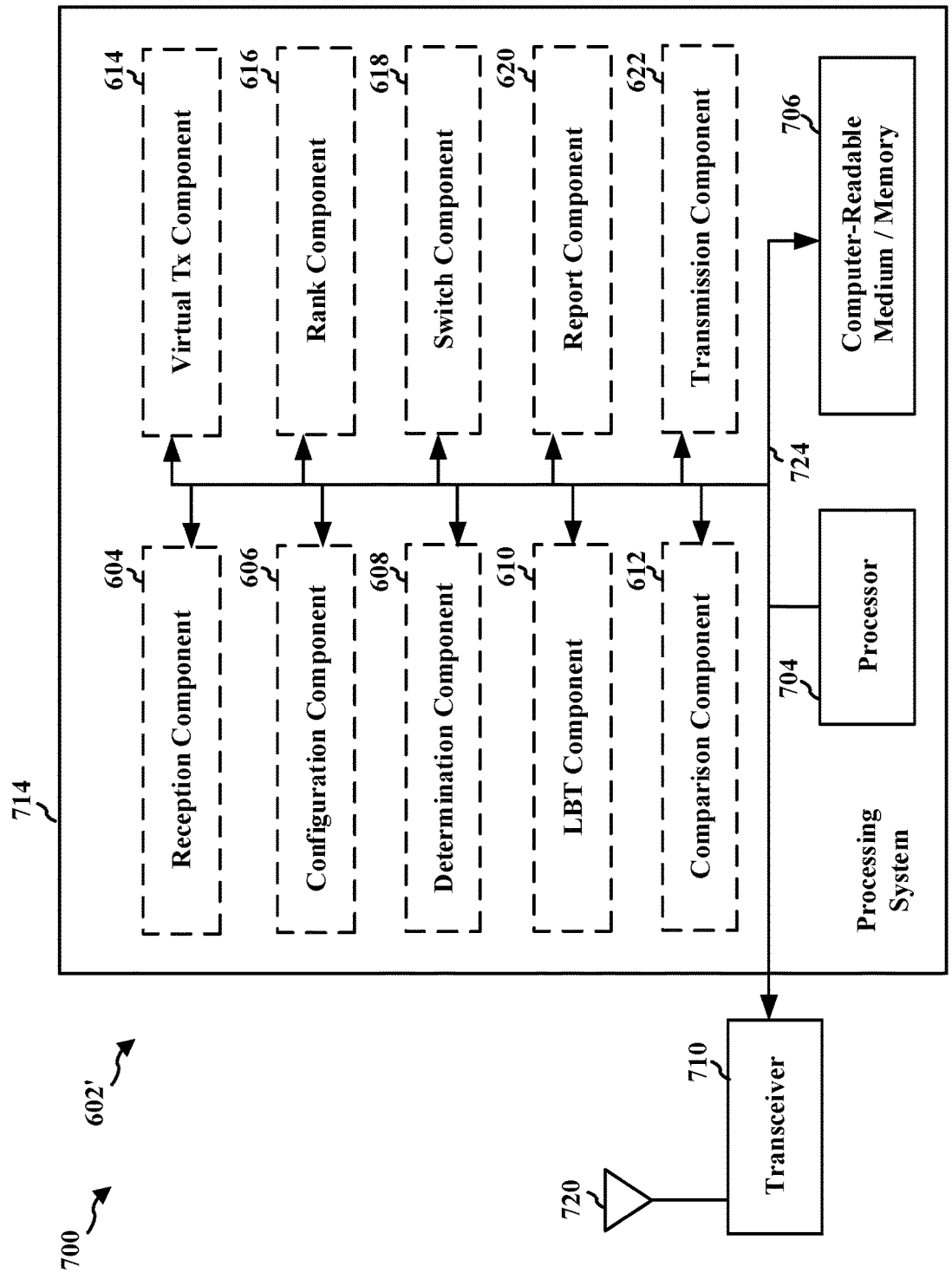
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, 616, 618, 620, 622, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 622, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614, 616, 618, 620, 622. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In some aspects, the apparatus 602/602' for wireless communication includes means for receiving a configuration from a first base station for the UE to perform a conditional handover. The apparatus includes means for determining a first unlicensed frequency channel is unavailable for a transmission to the first base station or from the first base station. The apparatus includes means for switching from the first unlicensed frequency channel to a second cell for communication through the second cell in the conditional handover upon receiving the configuration and upon determining that the first unlicensed frequency channel is unavailable for the transmission. The apparatus further includes means for determining that the first unlicensed frequency channel is unavailable for the transmission configured to determine the first unlicensed frequency channel is unavailable for the transmission based on at least one of a LBT protocol failing due to a number of failed attempts exceeding a first threshold number of failed attempts or a duration of failed attempts exceeding a first threshold duration. The apparatus further includes means for maintaining one or more counters associated with the number of failed attempts or one or more timers associated with the duration of failed attempts based on the LBT protocol to transmit one or more of the SR, the RACH, the PUSCH, or the SRS on the first unlicensed frequency channel. Each failed attempt corresponding to a determination that the first unlicensed frequency channel is unavailable for the transmission. The apparatus further includes means for resetting the one or more counters or the one or more timers upon a successful attempt based on the LBT protocol to transmit one or more of the SR, the RACH, the PUSCH, or the SRS on the first unlicensed frequency channel. The successful attempt corresponding to a determination that the first unlicensed frequency channel is available for the transmission. The apparatus further includes means for performing virtual transmission attempts. The apparatus further includes means for determining that the first unlicensed frequency channel is unavailable for the transmission configured to determine that the first unlicensed frequency channel is unavailable for the transmission based on a comparison of one or more of a RSRP, a RSRQ, a RSSI, a SINR, a SNR, or a channel occupancy or interference metric to a corresponding threshold. The apparatus further includes means for maintaining one or more counters associated with a number of occasions when one or more of the RSRP, the RSRQ, the SINR, or the SNR is less than the corresponding threshold within a monitoring duration, or when one or more of the RSSI or the channel occupancy or interference metric is greater than the corresponding threshold within the monitoring duration. The apparatus further includes means for determining the second cell based on a ranking configured by the first base station. The apparatus further includes means for sending a report to the first base station indicating the failure of the transmission upon determining that the first unlicensed frequency channel is unavailable for the transmission. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The present disclosure relates to configuring a UE to obtain access to an unlicensed frequency channel of the unlicensed frequency spectrum in the event of channel access failures. The present disclosure improves the manner in which the base station may configure the UE to perform a handover to another cell if the channel access problem occurs on a PCell or a PSCell. The base station may also configure the UE to de-activate an SCell if the channel access problem occurs, as well as to activate another configured SCell. At least one advantage of the disclosure is that the disclosure may improve communication reliability by enabling the base station and/or the UE to access an unlicensed frequency channel in a shorter amount of time, which may further improve communication data rate, capacity, and spectral efficiency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a wireless device at a user equipment (UE), comprising:
   receiving a configuration from a first base station for the UE to perform a conditional handover;
   determining a first unlicensed frequency channel is unavailable for a transmission to the first base station or from the first base station; and
   switching from the first unlicensed frequency channel to a second cell for communication through the second cell in the conditional handover upon receiving the configuration and upon determining that the first unlicensed frequency channel is unavailable for the transmission.

2. The method of claim 1, wherein the first unlicensed frequency channel is associated with a first primary cell of the first base station, wherein the second cell is associated with a first primary cell of a second base station or a second primary cell of the first base station, and wherein the switching from the first unlicensed frequency channel to the second cell for communication comprises moving from the first primary cell of the first base station to the first primary cell of the second base station or a second primary cell of the first base station.

3. The method of claim 1, wherein the first unlicensed frequency channel is associated with a first secondary cell of the first base station, wherein the second cell is associated with a second secondary cell of the first base station, and wherein switching from the first unlicensed frequency channel comprises deactivating the first secondary cell of the first base station.

4. The method of claim 1, wherein the determining that the first unlicensed frequency channel is unavailable for the transmission comprises determining the first unlicensed frequency channel is unavailable for the transmission based on at least one of a listen before talk (LBT) protocol failing due to a number of failed attempts exceeding a first threshold number of failed attempts or a duration of failed attempts exceeding a first threshold duration.

5. The method of claim 4, wherein the transmission is one of a scheduling request (SR), a random access channel (RACH) procedure, data on a physical uplink shared channel (PUSCH), or sounding reference signals (SRS) on the first unlicensed frequency channel.

6. The method of claim 5, further comprising: maintaining one or more counters associated with the number of failed attempts or one or more timers associated with the duration of failed attempts based on the LBT protocol to transmit one or more of the SR, the RACH, the PUSCH, or the SRS on the first unlicensed frequency channel, each failed attempt corresponding to a determination that the first unlicensed frequency channel is unavailable for the transmission; and resetting the one or more counters or the one or more timers upon a successful attempt based on the LBT protocol to transmit one or more of the SR, the RACH, the PUSCH, or the SRS on the first unlicensed frequency channel, the successful attempt corresponding to the determination that the first unlicensed frequency channel is available for the transmission.

7. The method of claim 4, wherein the transmission is a virtual transmission attempt, wherein the UE does not have any data to transmit in the virtual transmission attempt.

8. The method of claim 7, wherein the UE is configured to perform the virtual transmission attempt periodically.

9. The method of claim 8, wherein the UE is configured to perform the virtual transmission attempt with a first periodicity for a first type of the virtual transmission attempt and with a second periodicity for a second type of the virtual transmission attempt, the first type of the virtual transmission attempt being inside t transmission opportunity contended for and provided by the first base station, the second type of the virtual transmission attempt being outside the transmission opportunity contended for and provided by the first base station, the second type of the virtual transmission attempt being transmitted within the transmission opportunity contended for by the UE.

10. The method of claim 1, wherein the determining that the first unlicensed frequency channel is unavailable for the transmission comprises determining that the first unlicensed frequency channel is unavailable for the transmission based on a comparison of one or more of a reference signal received power (RSRP), a reference signal received quality (RSRQ), a received signal strength indicator (RSSI), a signal to interference plus noise ratio (SINR), a signal to noise ratio (SNR), or a channel occupancy or interference metric to a corresponding threshold.

11. The method of claim 10, further comprising maintaining one or more counters associated with a number of occasions when one or more of the RSRP, the RSRQ, the SINR, or the SNR is less than the corresponding threshold within a monitoring duration, or when one or more of the RSSI or the channel occupancy or the interference metric is greater than the corresponding threshold within the monitoring duration.

12. The method of claim 11, wherein the determining that the first unlicensed frequency channel is unavailable for the transmission is based on the number of occasions exceeding a threshold number of occasions within the monitoring duration.

13. The method of claim 1, further comprising determining the second cell based on a ranking configured by the first base station.

14. The method of claim 13, wherein the ranking is based on a combination of channel quality and channel load metrics.

15. The method of claim 13, wherein the ranking is based on a priority configured by the first base station.

16. The method of claim 13, wherein the ranking is based on success events of the LBT protocol for the second cell.

17. The method of claim 1, further comprising sending a report to the first base station indicating the failure of the transmission upon determining that the first unlicensed frequency channel is unavailable for the transmission.

18. The method of claim 17, wherein the report is sent by the UE to the first base station through a unicast radio resource control (RRC) message or a medium access control (MAC) control element (CE).

19. The method of claim 17, wherein the report is sent as part of a set of reports, each report in the set of reports being sent periodically to the first base station.

20. The method of claim 1, wherein the second cell includes an unlicensed frequency channel that was previously deactivated due to a failure of a previous transmission.

21. The method of claim 1, wherein the first base station is a secondary node, wherein the first unlicensed frequency channel is associated with a primary cell of the secondary node, and wherein the second cell is associated with another primary cell of the secondary node.

22. An apparatus for wireless communication at a user equipment (UE), comprising:
a memory; and
at least one processor coupled to the memory and configured to:
receive a configuration from a first base station for the UE to perform a conditional handover;
determine a first unlicensed frequency channel is unavailable for a transmission to the first base station or from the first base station; and
switch from the first unlicensed frequency channel to a second cell for communication through the second cell in the conditional handover upon receiving the configuration and upon determining that the first unlicensed frequency channel is unavailable for the transmission.

23. The apparatus of claim 22, wherein the first unlicensed frequency channel is associated with a first primary cell of the first base station, wherein the second cell is associated with a first primary cell of a second base station or a second primary cell of the first base station, and wherein to switch from the first unlicensed frequency channel to the second cell for communication the at least one processor is configured to move from the first primary cell of the first base station to the first primary cell of the second base station or a second primary cell of the first base station.

24. The apparatus of claim 22, wherein the first unlicensed frequency channel is associated with a first secondary cell of the first base station, wherein the second cell is associated with a second secondary cell of the first base station, and wherein to switch from the first unlicensed frequency channel the at least one processor is configured to deactivate the first secondary cell of the first base station.

25. The apparatus of claim 22, wherein to determine that the first unlicensed frequency channel is unavailable for the transmission, the at least one processor is configured to determine the first unlicensed frequency channel is unavailable for the transmission based on at least one of a listen before talk (LBT) protocol failing due to a number of failed attempts exceeding a first threshold number of failed attempts or a duration of failed attempts exceeding a first threshold duration.

26. The apparatus of claim 22, wherein to determine that the first unlicensed frequency channel is unavailable for the transmission, the at least one processor is configured to determine that the first unlicensed frequency channel is unavailable for the transmission based on a comparison of one or more of a reference signal received power (RSRP), a reference signal received quality (RSRQ), a received signal strength indicator (RSSI), a signal to interference plus noise ratio (SINR), a signal to noise ratio (SNR), or a channel occupancy or interference metric to a corresponding threshold.

27. The apparatus of claim 22, wherein the at least one processor is configured to determine the second unlicensed frequency channel based on a ranking configured by the first base station.

28. The apparatus of claim 22, wherein the first base station is a secondary node, wherein the first unlicensed frequency channel is associated with a primary cell of the secondary node, and wherein the second cell is associated with another primary cell of the secondary node.

29. An apparatus for wireless communication at a user equipment (UE), comprising:
    user equipment means for receiving a configuration from a first base station for the UE to perform a conditional handover;
    user equipment means for determining a first unlicensed frequency channel is unavailable for a transmission to the first base station or from the first base station; and
    user equipment means for switching from the first unlicensed frequency channel to a second cell for communication through the second cell in the conditional handover upon receiving the configuration and upon determining that the first unlicensed frequency channel is unavailable for the transmission.

30. A non-transitory computer-readable medium storing computer executable code for wireless communication at a user equipment (UE), the code when executed by a processor cause the processor to:
    receive a configuration from a first base station for the UE to perform a conditional handover;
    determine a first unlicensed frequency channel is unavailable for a transmission to the first base station or from the first base station; and
    switching from the first unlicensed frequency channel to a second cell for communication through the second cell in the conditional handover upon receiving the configuration and upon determining that the first unlicensed frequency channel is unavailable for the transmission.

* * * * *